(12) United States Patent
Hager et al.

(10) Patent No.: US 10,082,181 B2
(45) Date of Patent: Sep. 25, 2018

(54) COOLING SLEEVE FOR A BEARING AND BEARING INCLUDING A COOLING SLEEVE

(71) Applicant: Robert Bosch GmbH, Stuttgart (DE)

(72) Inventors: Simon Hager, Aefligen (CH); Roger Tresch, Möhlin (CH); Werner Stieger, Oensingen (CH); Rolf Boller, Sissach (CH)

(73) Assignee: ROBERT BOSCH GMBH, Stuttgart (DE)

( * ) Notice: Subject to any disclaimer, the term of this patent is extended or adjusted under 35 U.S.C. 154(b) by 83 days.

(21) Appl. No.: 15/126,388

(22) PCT Filed: Jan. 15, 2015

(86) PCT No.: PCT/EP2015/050656
§ 371 (c)(1),
(2) Date: Sep. 15, 2016

(87) PCT Pub. No.: WO2015/144320
PCT Pub. Date: Oct. 1, 2015

(65) Prior Publication Data
US 2017/0082147 A1 Mar. 23, 2017

(30) Foreign Application Priority Data
Mar. 26, 2014 (DE) .................. 10 2014 205 599

(51) Int. Cl.
*F16C 37/00* (2006.01)
*F02C 7/06* (2006.01)
(Continued)

(52) U.S. Cl.
CPC ............... *F16C 37/00* (2013.01); *F02C 7/06* (2013.01); *F16C 35/02* (2013.01); *H02K 7/08* (2013.01);
(Continued)

(58) Field of Classification Search
CPC ...... F16C 17/02; F16C 33/7886; F16C 35/02; F16C 35/10; F16C 37/00; F16C 37/002;
(Continued)

(56) References Cited

U.S. PATENT DOCUMENTS 3,149,819 A * 9/1964 Baumann ............... F04D 29/057
384/100
3,155,856 A * 11/1964 Macha ................... H02K 5/128
310/43
(Continued)

FOREIGN PATENT DOCUMENTS

CN 2809319 Y 8/2006
CN 103081304 A 5/2013
(Continued)

OTHER PUBLICATIONS

International Search Report dated Apr. 13, 2015, of the corresponding International Application PCT/EP/2015/050656, filed on Jan. 15, 2015.

*Primary Examiner* — Phillip A Johnson
(74) *Attorney, Agent, or Firm* — Norton Rose Fulbright US LLP; Gerard Messina

(57) ABSTRACT

A cooling sleeve for a bearing as well as a corresponding bearing, the cooling sleeve including a radial flange having a central passage opening, in which a bearing sleeve may be accommodated, in particular with the aid of a press-fit. In order to keep a mechanical stress at a low level, slits extending radially outwardly originate from the central passage opening.

11 Claims, 4 Drawing Sheets

(51) Int. Cl.
*F16C 35/02* (2006.01)
*H02K 7/08* (2006.01)
*H02K 9/22* (2006.01)
*F16C 17/02* (2006.01)

(52) U.S. Cl.
CPC ........... *H02K 9/22* (2013.01); *F05D 2260/20* (2013.01); *F16C 17/02* (2013.01); *F16C 2380/26* (2013.01)

(58) Field of Classification Search
CPC .... F16C 37/007; F16C 2380/26; F16C 27/02; F16C 33/04; H02K 5/167; H02K 5/1672; H02K 5/1675; H02K 5/1677; H02K 7/08; H02K 7/083; H02K 7/085; H02K 7/086; H02K 7/06; H02K 9/22
See application file for complete search history.

(56) References Cited

U.S. PATENT DOCUMENTS

| | | |
|---|---|---|
| 3,773,396 A | 11/1973 | Easley |
| 4,623,810 A * | 11/1986 | Smith ..................... F16C 35/02 310/43 |
| 4,715,732 A * | 12/1987 | Sanders .................... B25F 5/00 310/90 |
| 5,360,274 A | 11/1994 | Strobl |
| 6,762,527 B1 * | 7/2004 | Horng .................. H02K 1/2793 310/156.18 |
| 8,466,588 B2 * | 6/2013 | Huang ..................... H02K 9/14 310/54 |
| 2004/0096130 A1 | 5/2004 | Saville et al. |

FOREIGN PATENT DOCUMENTS

| | | | |
|---|---|---|---|
| DE | 1204316 B | 11/1965 | |
| DE | 4116369 A1 | 12/1991 | |
| DE | 10220690 A1 * | 11/2003 | ............ F16C 13/006 |
| DE | 10331348 A1 | 6/2004 | |
| DE | 112006003601 T5 | 11/2008 | |
| DE | 102008017755 A1 | 10/2009 | |
| GB | 962277 A | 7/1964 | |
| GB | 2458287 A | 9/2009 | |
| JP | H08140311 A | 5/1996 | |
| JP | 2010091053 A | 4/2010 | |
| WO | 2013041198 A1 | 3/2013 | |

\* cited by examiner

COOLING SLEEVE FOR A BEARING AND BEARING INCLUDING A COOLING SLEEVE

FIELD

The present invention relates to a cooling sleeve for a bearing, in particular a radial bearing or axial bearing, as well as a bearing including a corresponding cooling sleeve.

BACKGROUND INFORMATION

Bearings such as axial bearings and radial bearings are used, for example, for supporting a shaft in a housing. In this case, an insufficient heat dissipation via the bearing sleeve may, for example, limit the use of permanent magnets and/or bindings in the rotor area of an electric motor. Furthermore, heat-related changes in length may result in asymmetries and a distortion in the bearing support.

Heat sinks are often used for heat dissipation. However, so that an adequate heat dissipation may occur via such heat sinks, they must be in direct contact with, for example, the bearing sleeve, the press-fit normally used for this resulting in a mechanical stress of the bearing sleeve.

For example, a cooling system for a gear unit is described in German Patent Application No. DE 10 2008 017 755 A1, which includes a heat sink, having a passage bore for passing a shaft through, and cooling ribs extending from the heat sink in the radial direction. This heat sink rotates with the shaft, an additional cooling effect being obtained from an air turbulence resulting from the movement of the heat sink or the ribs.

It is very difficult to use such a heat sink in a confined space, in particular within a housing of an electric motor or, for example, a compressor. Furthermore, an adequate supply of fresh air is required. It is difficult to implement additional cooling with the aid of a cooling liquid.

An object of the present invention is to provide a possibility for cooling a bearing sleeve, in particular with the aid of fluid cooling, which makes effective heat dissipation possible, requires little space, and keeps the mechanical stress of the bearing sleeve at a low level.

This objective may be achieved by a cooling sleeve in accordance with example embodiments of the present invention.

SUMMARY

In the case of a cooling sleeve for a bearing including a radial flange having a central passage opening, in which a bearing sleeve may be fitted, it is also provided according to an embodiment of the present invention that slits tending to extend radially outwards originate from the central passage opening. These slits are closed on their radially outer end and are open toward the passage opening. In this context, tending to extend radially outwards means that an outer closed end of the particular slit lies further to the outside in the radial direction than the central passage opening from which the slits originate. The slits may thus be formed in a straight line or bent; in a preferred embodiment they run in a straight line and perpendicular to a longitudinal axis of the cooling sleeve. These slits reduce the stiffness of the cooling sleeve without noticeably influencing a heat flow from the bearing sleeve to the outside via the cooling sleeve. This reduces the mechanical stress of the bearing sleeve, caused in particular by a constriction resulting from a press-fit. Nonetheless, it is possible to ensure a secure contact between the cooling sleeve and the bearing sleeve, which is necessary for good heat dissipation. Suitable bearings are primarily radial bearings; however, a use for axial bearings is also possible. At the same time, the cooling sleeve makes a transport of heat possible from the bearing sleeve to a surrounding housing wall of the bearing, with which the bearing sleeve may be brought into contact.

Preferably, the bearing sleeve is held in the passage opening with the aid of a press-fit. This ensures a secure hold and good heat transfer. Alternatively or in addition, the bearing sleeve may also be, for example, screwed, soldered, welded or glued within the passage opening.

It is preferred in particular that the slits are distributed uniformly in the circumferential direction. This also results in uniform loads, force distribution and thermal conduction.

Advantageously, a widening is formed on one radially outer end of the slits in each case, the widening being formed in particular in the shape of a circle. The slits are thus widened on their radially outer ends. This widening further improves the elasticity of the cooling sleeve, in particular minimizing the risk that cracks occur in the material in the case that the cooling sleeve is deformed.

Preferably, elastic and/or flexible brackets are situated on one outer edge of the flange, the brackets extending axially. These elastic brackets are then used for contact with a housing, so that the heat may be dissipated from the bearing sleeve via the flange and the brackets to the housing. If necessary, active cooling of the brackets may also be provided with the aid of a cooling liquid. Here, the brackets may be dimensioned in such a way that they are in contact with the housing under pre-stressing, resulting in a secure contact and consequently a good heat transfer. The brackets may be distributed uniformly over the entire circumference of the flange; however, it is also possible to provide groups of brackets, in order to achieve a good utilization of the available space.

The brackets may then be situated in such a way that they have a cylindrical contour. In this case, it is possible to implement a radial press-fit to the housing via the brackets. In particular, the cooling sleeve then has an generally C-shaped longitudinal section together with the brackets and the flange.

In a preferred specific refinement, the brackets, originating from the flange, are inclined to the outside, at least in sections. This makes it possible in a relatively simple manner to introduce the brackets into a housing of the bearing under pre-stressing, it being possible to achieve a planar contact of the brackets with a housing wall. The inclination improves the deformability of the brackets, while nonetheless good heat transport is achieved with the aid of thermal conduction.

Preferably, the flange has an at least partially conical circumferential wall, which widens in the direction of the brackets. Such a conical design makes it easier to introduce the cooling sleeve into the housing. In particular, this makes prepositioning possible and prevents an overloading of the brackets.

In one preferred specific embodiment, a constriction is formed between the conical circumferential wall and the brackets. As a result, adequate space is available for the movement of the brackets. A material thickness of the brackets in the area of their connection to the flange is also kept low, so that the elasticity may be relatively high. Furthermore, the constriction may also be used as a stop, in order to secure the cooling sleeve axially in relation to the housing wall.

In another preferred specific embodiment, the cooling sleeve has a tubular wall, which extends axially beyond the flange on both sides. The cooling sleeve then has an H-shaped longitudinal section. From the tubular wall, the flange extends radially inwards, the flange being situated in particular centrally, i.e., having an identical distance to the ends of the tubular wall. In particular, the wall is formed integrally with the flange.

The tubular wall makes extensive heat emission from the cooling sleeve possible. For example, the tubular wall may be in planar contact with a housing.

In one preferred embodiment, ribs are impressed in one outer side of the wall. Consequently, an enlarged surface is available for the heat emission. It is also possible, for example, to conduct a cooling liquid through the ribs and thus actively dissipate heat from the cooling sleeve. The cooling liquid may then be guided in particular between the ribs, so that it may flow through between the cooling sleeve and a housing. For this purpose, the ribs are in particular designed to extend in the circumferential direction.

Preferably, annular grooves are formed on axial ends of the wall for accommodating a seal. The annular grooves are designed to extend in particular in the circumferential direction. With the aid of these seals, which are in particular designed as radial seals or axial seals, it is possible to establish a tight seal between the cooling sleeve and the housing, without the requirement of a direct contact of the cooling sleeve on the wall. This makes it possible to compensate material and manufacturing tolerances, the mechanical stress of the cooling sleeve being kept low. The seals, which are in particular designed as O-rings, make a mechanical decoupling of the housing and cooling sleeve possible.

Preferably, the material thickness in the area of the wall is less than in the area of the flange. The wall thus has a relatively low stiffness. Mechanical stress and the transfer of stresses are thus kept low.

The objective is achieved by a bearing including a cooling sleeve by fitting a bearing sleeve into the passage opening of the cooling sleeve. Thus, the cooling sleeve is attached securely to the bearing sleeve, a good heat transfer being ensured, for example, by a press-fit. However, the cooling sleeve may also be attached, for example, with the aid of gluing, soldering, welding or using a screw connection. The cooling sleeve is designed in such a way that it allows a radial heat dissipation. For this purpose, the cooling sleeve includes an appropriate thermally conductive material; for example, it is designed as a sheet metal part or as a cast part.

It is preferred in particular that the cooling sleeve is situated on an area of the bearing sleeve having a reduced or enlarged diameter, it being possible for the bearing sleeve and the cooling sleeve to be placed into radial or axial contact with a housing wall. It is thus possible to achieve an uninterrupted heat flow. If necessary, a cooling liquid may be passed between the housing wall and the cooling sleeve, in order to establish an active heat dissipation. However, it is also conceivable to place the cooling sleeve into contact with the housing wall under pre-stressing and thus to transfer the heat directly.

A preferred area of application for such a bearing including a corresponding cooling sleeve is for example, in turbo-compressors, which are used in particular in reversible heat pumps. In such turbo-compressors, a precise, fast and powerful rotation of the shaft supported in the bearing sleeve is required. For this purpose, an adequate heat dissipation is required, in particular from the bearing sleeve, which may be implemented by the cooling sleeve according to the present invention.

The present invention will be described in greater detail below with reference to preferred exemplary embodiments in connection with the figures.

DETAILED DESCRIPTION OF EXAMPLE EMBODIMENTS

Figure 1:
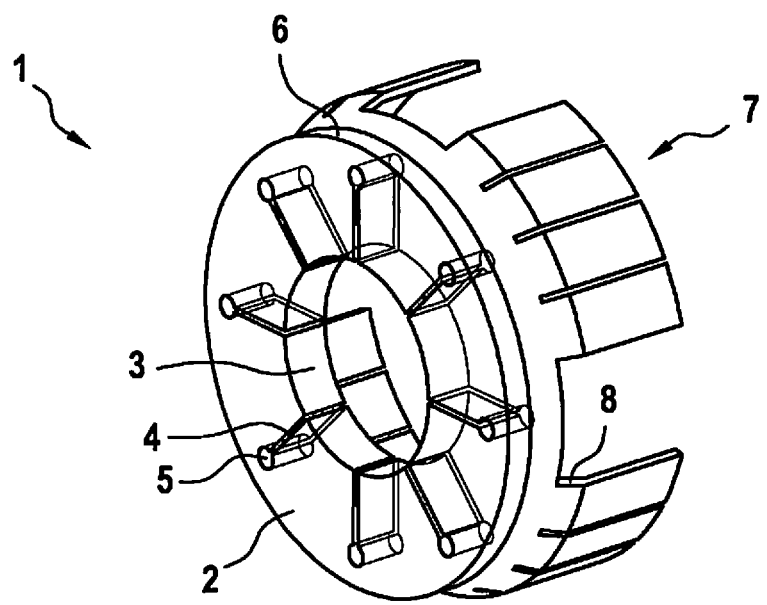
FIG. 1 shows a first specific embodiment of a cooling sleeve in a three-dimensional representation.

A cooling sleeve 1 is shown in FIG. 1 for a bearing designed as a radial bearing, the cooling sleeve including a radial flange 2, which is provided with a central passage opening 3. A bearing sleeve may be pressed into the passage opening, so that the bearing sleeve is in planar contact with an inner surface of flange 2 in the area of passage opening 3. This makes a good heat dissipation possible from the bearing sleeve to flange 2 and consequently also to cooling sleeve 1.

In flange 2, multiple slits 4 are formed distributed uniformly in the circumferential direction, which are open to passage opening 3 radially inwardly, but are closed radially outwardly. The slits have a circular widening 5 on their radially outer end.

Elastically flexible brackets 7 are situated on an outer edge 6 of flange 2, which extend essentially in the axial direction. In this case, brackets 7 having an area 8 are connected to flange 2, which is inclined radially outwardly. This makes it possible for brackets 7 to come into contact with a housing under radial pre-stressing.

Figure 2:
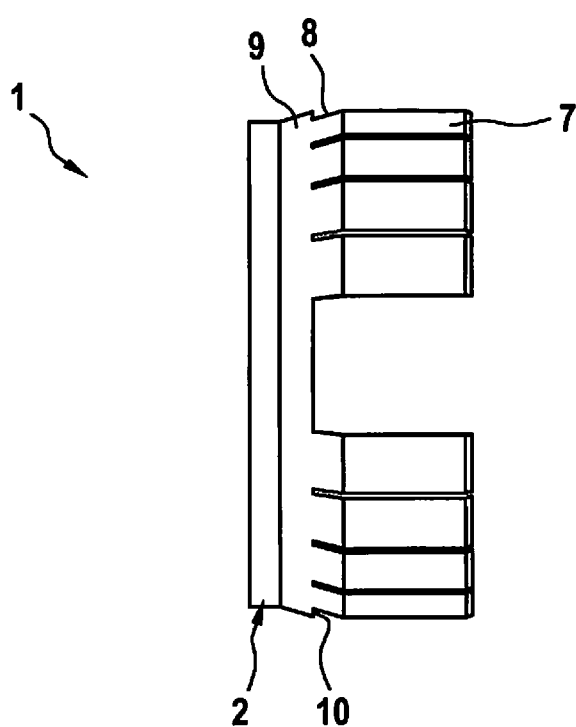
FIG. 2 shows a side view of the cooling sleeve according to FIG. 1.

A side view of cooling housing 1 according to FIG. 1 is shown in FIG. 2. It is apparent that flange 2 has a partially conical circumferential wall 9, which widens in the direction of brackets 7. A constriction 10 is formed between conical circumferential wall 9 and brackets 7, so that conical circumferential wall 9 does not influence the elasticity of brackets 7.

Figure 3:
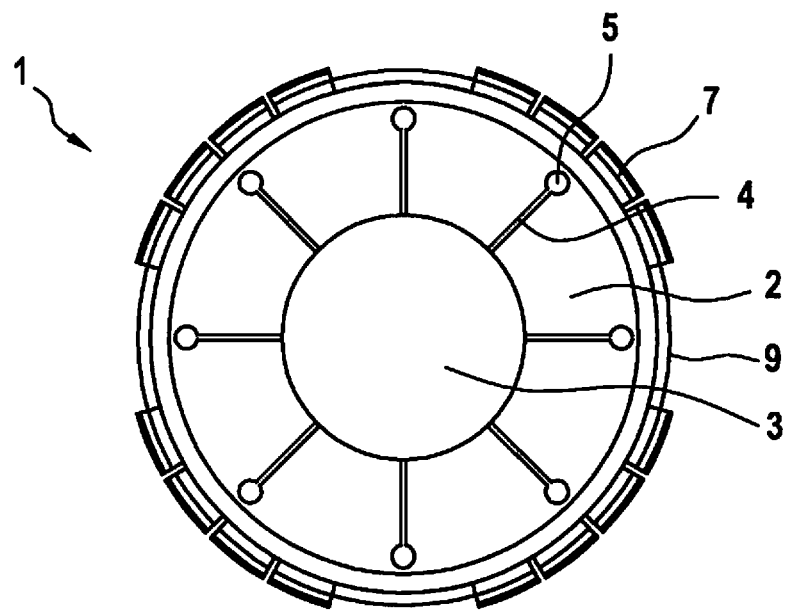
FIG. 3 shows a frontal view of the cooling sleeve according to FIG. 1.

FIG. 3 shows cooling sleeve 1 according to FIG. 1 in a frontal view. It is apparent that brackets 7 lie on an imaginary cylinder wall. In this exemplary embodiment, brackets 7 are in each case combined in groups of four brackets. However, other embodiments are also possible.

Figure 4:
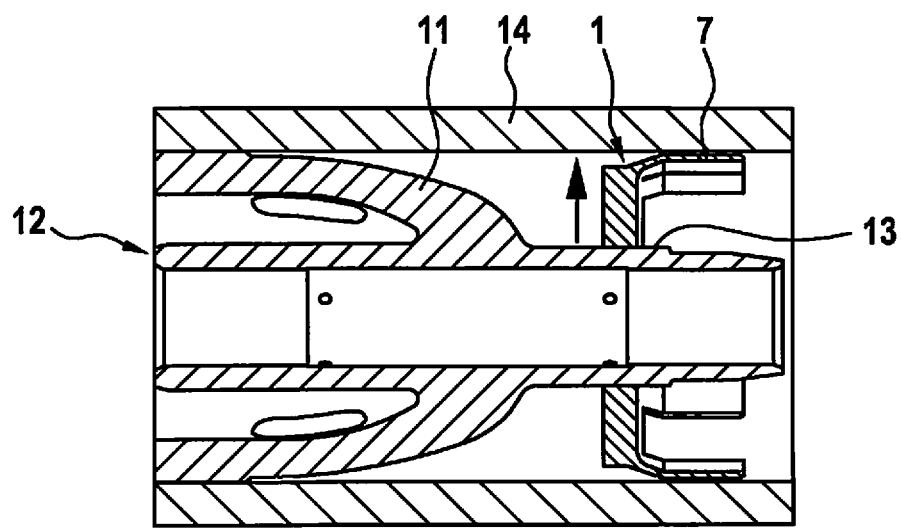
FIG. 4 shows a bearing including a cooling sleeve according to FIG. 1.

FIG. 4 shows the installation situation of cooling sleeve 1 in combination with a bearing sleeve 11 of a bearing 12 designed as a radial bearing. Cooling sleeve 1 is pressed onto bearing sleeve 11 in an area 13, which has a reduced diameter. On the circumference or in the radial direction, cooling sleeve 1 as well as bearing sleeve 11 are in contact with a housing wall 14 via brackets 7. This makes it possible to dissipate heat from bearing sleeve 11 onto housing wall 14 via cooling sleeve 1.

Figure 5:
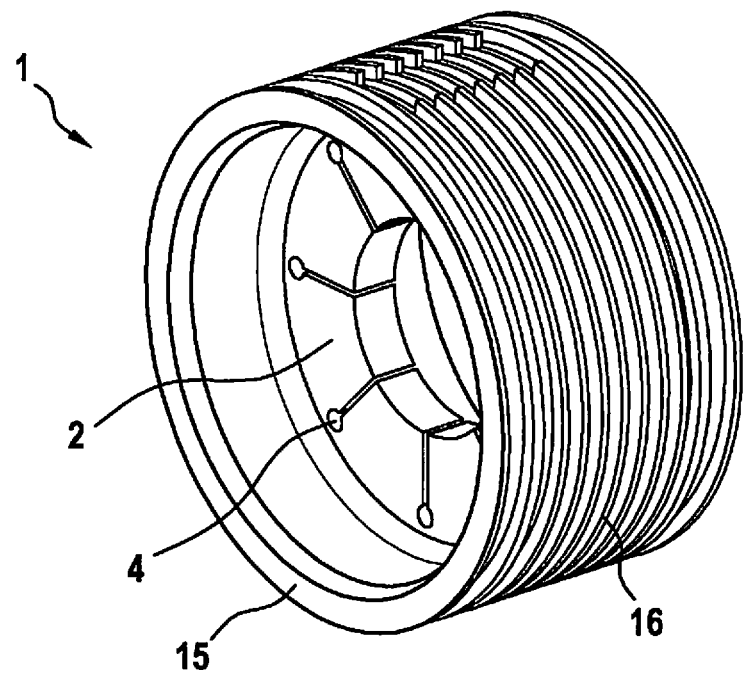
FIG. 5 shows a second specific embodiment of a cooling sleeve in a three-dimensional representation.

A second specific embodiment of cooling sleeve 1 is shown in FIG. 5. In contrast to the cooling sleeve of the first specific embodiment, as shown in FIGS. 1 through 4, the cooling sleeve according to FIG. 5 has no generally C-shaped longitudinal section, but has instead an H-shaped longitudinal section. Flange 2 is situated centrally within a tubular wall 15, it being formed in particular integrally with wall 15.

Flange 2 is provided with slits 4 as in the first specific embodiment of cooling sleeve 1. In one outer side of tubular wall 15 ribs 16 are impressed, resulting in the formation of channels, through which the cooling liquid may be guided, in order to actively transport heat away from the cooling sleeve. In the area of an inlet and an outlet, the ribs may be interrupted or offset, in order to improve the distribution of the cooling liquid.

Figure 6:
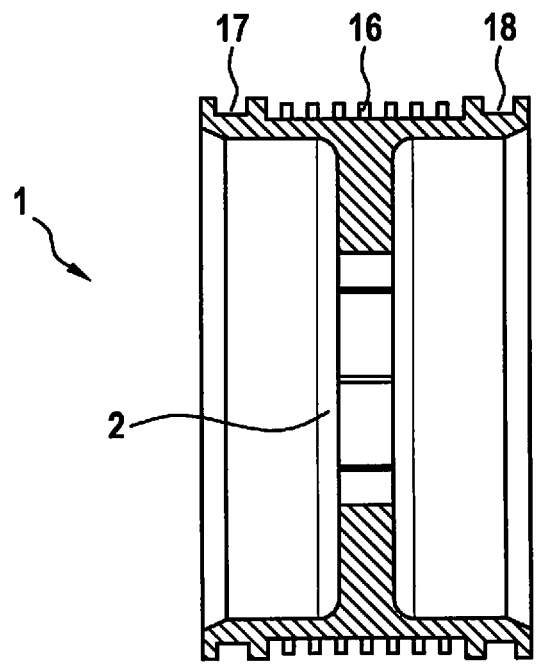
FIG. 6 shows a sectional side view of the cooling sleeve according to FIG. 5.

As is apparent in FIG. 6, for example, which shows a side view of cooling sleeve 1 of the second specific embodiment, an annular groove 17, 18 is formed in each case on axial ends of the wall, the grooves being used for accommodating seals. Such a seal is, for example, an O-ring. With the aid of such seals, a cooling liquid may be applied to the area between annular grooves 17, 18 including ribs 16, an axial escape of the cooling liquid which is enclosed between the cooling sleeve and a housing wall being prevented by the seals which are situated in annular grooves 17, 18. Appropriate feed or discharge channels for the cooling liquid may subsequently be formed in the housing or the housing wall.

Figure 7:
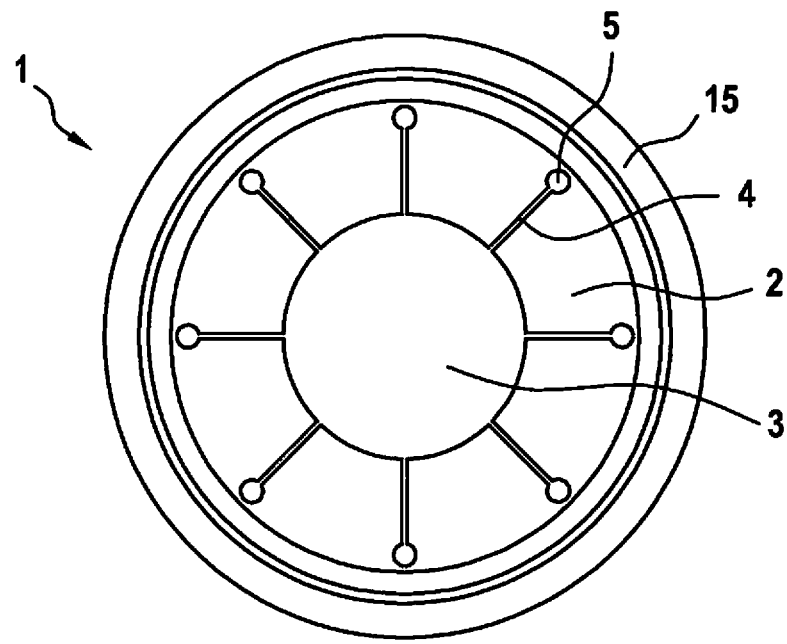
FIG. 7 shows a frontal view of the cooling sleeve according to FIG. 5.

FIG. 7 shows a frontal view of cooling sleeve 1 according to FIG. 5.

Figure 8:
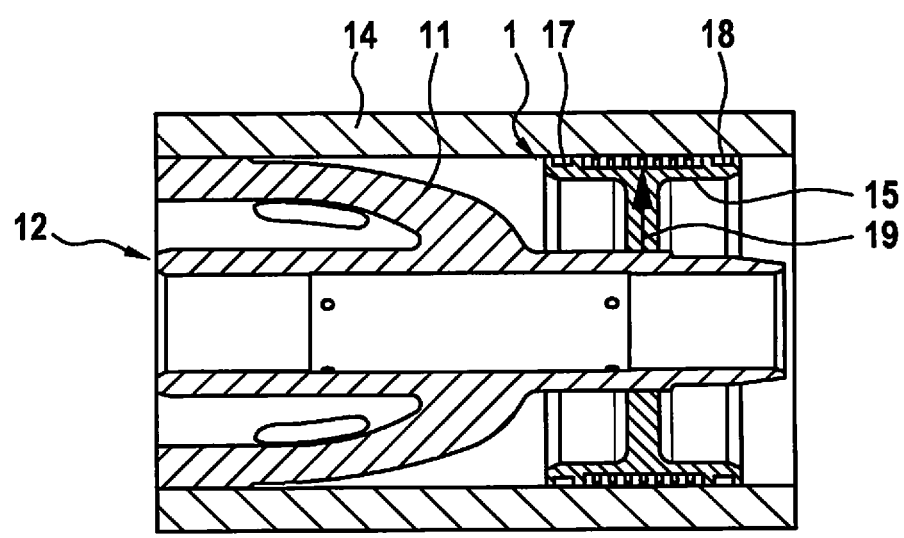
FIG. 8 shows a bearing including a cooling sleeve according to FIG. 5.

In FIG. 8, this cooling sleeve 1 is shown in an installation situation, in which it is pressed onto a bearing sleeve 11. Between annular grooves 17, 18, it is shown schematically that a cooling liquid is present. An arrow 19 symbolizes the transport of heat from bearing sleeve 11 through cooling sleeve 1 to the cooling liquid and to housing wall 15.

The cooling sleeve according to the present invention allows an effective removal of heat from the bearing sleeve, without requiring large installation space. A secure contact of the cooling sleeve on the bearing sleeve is established via press-fitting, the forces acting on the bearing sleeve being kept low due to the elasticity of the flange of the cooling sleeve which is achieved by slits, so that mechanical impairment also remains low. For the transfer of heat from the cooling sleeve to the housing wall, either the cooling sleeve is placed into contact with the housing wall with the aid of brackets, thus achieving a direct heat transfer, or a heat dissipation is achieved with the aid of a cooling liquid, with no mechanical contact being established between the housing wall and the cooling sleeve. Therefore, no stresses are introduced into the bearing or the housing wall via the cooling sleeve.

The present invention is not limited to the described exemplary embodiments. It is thus, for example, also possible to modify the specific embodiment of the cooling sleeve shown in FIGS. 5 through 8 in such a way that it has a C-shaped longitudinal section. It is also possible to vary the number of brackets in the specific embodiment according to FIGS. 1 through 4. The present invention may be used with both axial bearings and radial bearings.

What is claimed is:

1. A cooling sleeve for a bearing, comprising:
   a radial flange with a central passage opening into which a bearing sleeve is fit, and having slits originating from the central passage opening and extending radially outwardly;
   wherein at least one of elastic brackets and flexible brackets are situated on one outer edge of the flange, the brackets extending axially.

2. The cooling sleeve as recited in claim 1, wherein the bearing sleeve is accommodated in the passage opening with a press-fit.

3. The cooling sleeve as recited in claim 1, wherein a widening is formed on one radially outer end of the slits in each case, the widening being formed in the shape of a circle.

4. The cooling sleeve as recited in claim 1, wherein the brackets originating from the flange are inclined outwardly, at least in sections.

5. The cooling sleeve as recited in claim 1, wherein the flange has an at least partially conical circumferential wall, which widens in the direction of the brackets.

6. The cooling sleeve as recited in claim 5, wherein a constriction is formed between the conical circumferential wall and the brackets.

7. A cooling sleeve for a bearing, comprising:
   a radial flange with a central passage opening into which a bearing sleeve is fit, and having slits originating from the central passage opening and extending radially outwardly; and
   a tubular wall which extends axially beyond the flange on both sides.

8. The cooling sleeve as recited in claim 7, wherein ribs are impressed in one outer side of the wall.

9. The cooling sleeve as recited in claim 7, wherein annular grooves are formed in the area of axial ends of the wall for accommodating a seal.

10. The cooling sleeve as recited in claim 7, wherein a material thickness in the area of the wall is less than in the area of the flange.

11. A bearing, comprising:
    a cooling sleeve for a bearing having a radial flange with a central passage opening, and having slits originating from the central passage opening and extending radially outwardly; and
    a bearing sleeve inserted into the central passage opening of the cooling sleeve;
    wherein the cooling sleeve is situated on an area of the bearing sleeve with a modified diameter, the bearing sleeve and the cooling sleeve being in contact with a housing wall.

* * * * *